United States Patent
Scherer, III

(10) Patent No.: US 11,861,602 B2
(45) Date of Patent: Jan. 2, 2024

(54) PAYMENT TOKEN

(71) Applicant: Hewlett Packard Enterprise Development LP, Houston, TX (US)

(72) Inventor: William Norwood Scherer, III, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 372 days.

(21) Appl. No.: 17/032,096

(22) Filed: Sep. 25, 2020

(65) Prior Publication Data

US 2022/0101317 A1 Mar. 31, 2022

(51) Int. Cl.
| | |
|---|---|
| G06Q 20/38 | (2012.01) |
| G06Q 20/26 | (2012.01) |
| G06Q 20/40 | (2012.01) |
| H04L 67/562 | (2022.01) |

(52) U.S. Cl.
CPC ....... G06Q 20/38215 (2013.01); G06Q 20/26 (2013.01); G06Q 20/3829 (2013.01); G06Q 20/4014 (2013.01); H04L 67/562 (2022.05)

(58) Field of Classification Search
CPC .............................................. G06Q 20/38215
See application file for complete search history.

(56) References Cited

U.S. PATENT DOCUMENTS 9,836,759 B2 * 12/2017 Georgi ............... G06Q 30/0229
10,505,978 B2 * 12/2019 Wang .................... G06Q 20/352

| | | | |
|---|---|---|---|
| 2008/0223918 A1 | 9/2008 | Williams et al. | |
| 2014/0089184 A1 | 3/2014 | Barkan et al. | |
| 2018/0324184 A1 | 11/2018 | Kaja et al. | |
| 2019/0180275 A1 | 6/2019 | Safak et al. | |
| 2020/0058047 A1 | 2/2020 | Khan et al. | |
| 2020/0074112 A1 | 3/2020 | Ren et al. | |

FOREIGN PATENT DOCUMENTS

WO WO-2019195676 A1 10/2019

OTHER PUBLICATIONS

Mouad Zouina and Benaceur Outtaj, "Towards a Distributed Token Based Payment System Using Blockchain Technology," Apr. 2019, pp. 1-10, IEEE.

* cited by examiner

*Primary Examiner* — John W Hayes
*Assistant Examiner* — Zehra Raza
(74) *Attorney, Agent, or Firm* — Trop, Pruner & Hu, P.C.

(57) ABSTRACT

Examples implementations relate to payment tokens. An example includes a customer computer creating a first data buffer, with a set of customer-specified parameters, signing the first data buffer with a customer private key, associating a customer public key to the signed first data buffer to create a first data record that is communicated to a service provider. The service provider computer creates a second data buffer with a set of service provider-specified parameters, signs the second data buffer with a first private key of the service provider, associates a first public key of the service provider to the signed second data buffer to create a second data record, combines the first and second data records, signs the combined data record with a second private key of the service provider, and associates a second public key of the service provider to the combined data record.

20 Claims, 9 Drawing Sheets

PAYMENT TOKEN

BACKGROUND

This disclosure is directed to systems and methods for creating and using secure payment authorization tokens.

Software as a Service (SaaS) is a software licensing and delivery model in which the software may be accessed or used on a subscription basis. The software may be located in a central location such as a cloud location and is accessible via a network.

As-a-Service subscription models are not limited to software. Hardware is also increasingly being made available in a similar manner. Succeeding updated versions of a hardware device may be made available to a subscriber as they are developed and replace previous versions.

This concept can be extended to making computing resources or services of a service provider available in a marketplace to users. Users can utilize the services in their applications. Users can subscribe to the services or can use them on a pay-as-you go basis. In such a scenario, an efficient accounting and payment process is also desirable.

BRIEF DESCRIPTION OF THE DRAWINGS

The several features, objects, and advantages of exemplary embodiments will be understood by reading this description in conjunction with the drawings. The same reference numbers in different drawings identify the same or similar elements. In the drawings.

DETAILED DESCRIPTION

Figure 1:
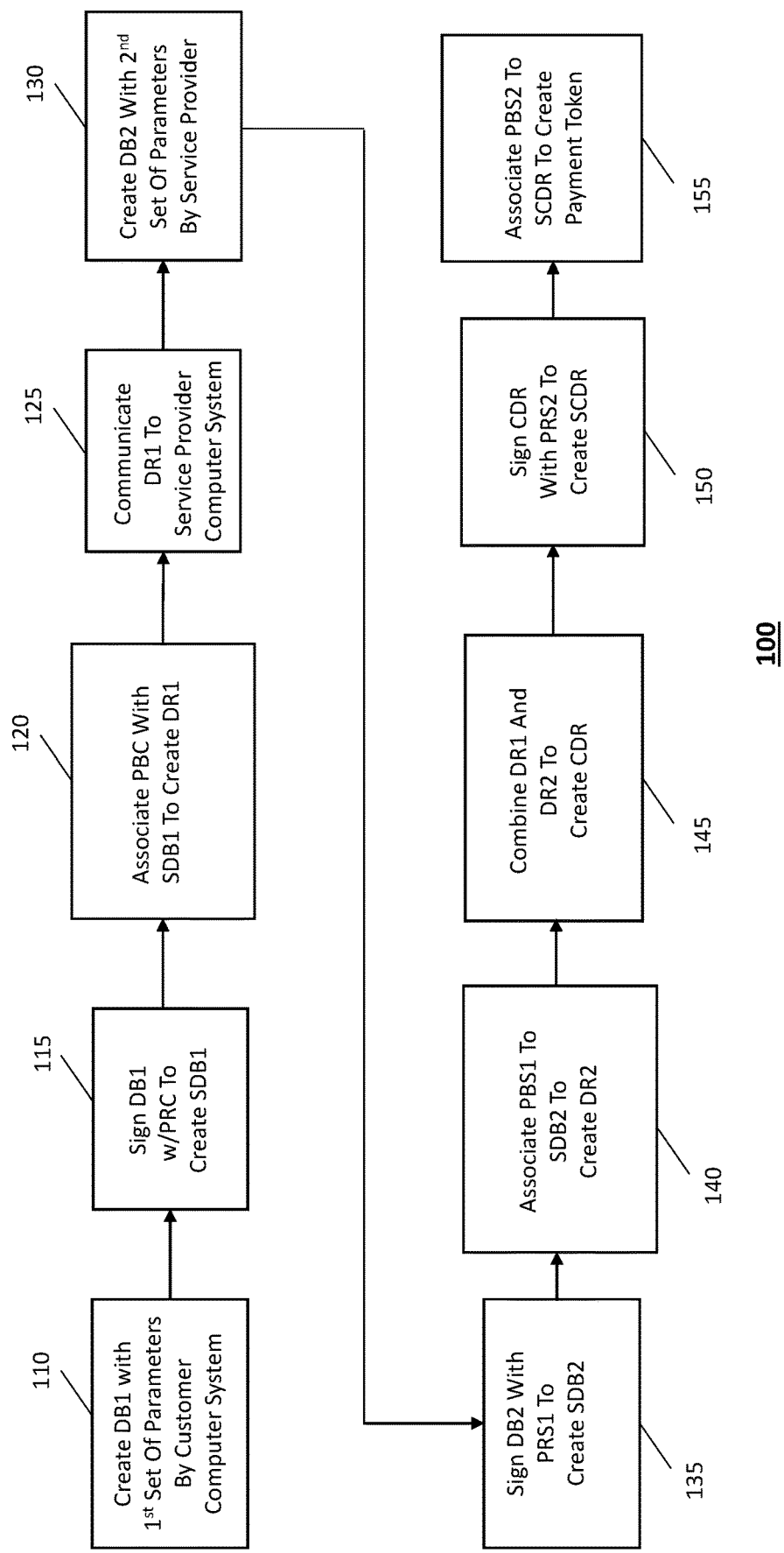
FIGS. 1 and 2 illustrate an example method for creating a secure payment token.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the exemplary embodiments.

Reference throughout this specification to an "example embodiment" or "example embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

Software, hardware, or other technology may be provided to users as a service, whereby users subscribe to the service or can use them on a pay-as-you go basis. In such a scenario, an efficient accounting and payment process is desirable.

Due to concerns with security, payments (as well as provisioning of services) in SaaS have to be processed in a secure and reliable manner.

This disclosure is directed providing novel methods and systems for facilitating such service availability and payment process in a secure and reliable manner. Example embodiments as disclosed provide for a payment authorization token that can be used to pay for computing services of a service provider utilized by a user or customer. The token may be encrypted and may include a combined plurality of encrypted data records.

In particular, a method for creating a payment token is disclosed. The method includes a service provider computer receiving a first data record from a customer computer. The first data record includes a first data buffer signed by a private key of the customer and having a public key of the customer associated therewith wherein the first data buffer includes a first set of parameters specified by the customer. The service provider computer creates a second data buffer including a second set of parameters specified by the service provider. The second data buffer is signed with a first private key of the service provider. A first public key of the service provider is associated to the signed second data buffer to create a second data record. The first and second data records are combined to create a combined data record. The combined data record is signed with a second private key of the service provider. A second public key of the service provider is associated to the signed combined data record to create the payment token.

The secure payment authorization token may incorporate a set of parameters specified by or associated with a user/customer along with a set of parameters specified by or associated with a service provider. In the description, it is to be understood that, even if not stated specifically, the term "customer" may include a computer, a computer system or a computing associated with a customer. Similarly, the terms "service provider" may include a computer, a computer system or a computing system associated with a service provider.

A method 100 in accordance with an example embodiment is illustrated in FIG. 1. Method 100 may be performed by hardware processor-based computing systems. A customer computer system (i.e. computing system of a customer subscribing to the services of a service provider) may create a first data buffer (DB1) at 110. DB1 may include a first set of parameters. The first set of parameters may include a customer identification (such as an account number) and a customer payment source information. The payment source information can be a bank account number or a credit or debit card number for example.

DB1 may then be signed with a private key associated with the customer (PRC) at 115 to create a first signed data buffer (SDB1). SDB1 may have a customer public key (PBC) associated therewith to create a first data record (DR1) at 120. DR1 may then be communicated to a computer system associated with a service provider at 125. The service provider may include a hardware processor-based computing system for managing accounting, metering, and/or other transactions associated with providing a service to the customer.

The service provider (computer system) may create a second data buffer (DB2) at 130. DB2 may include a second set of parameters. The second set of parameters may include a customer identification and a service provider specified promotion. The service provider specified promotion may include a specific number (e.g. a payment amount) or a percentage. The specific dollar amount or percentage of the promotion may reflect an amount of credit or discount that is applied to a customer's charges incurred for using services provided by the service provider.

The second set of parameters may also include an expiration date. The token including the parameters may be invalid beyond the expiration date. In some embodiments, the promotional credit or discount may no longer be applicable beyond the expiration date. The second set of parameters may also include a period of validity of the promotional credit or discount from the date of first use of the token. That is, the promotional credit or discount may expire after ten days from the date of first use of the token for example.

DB2 created by the service provider may be signed (by service provider computer system) with a first private key associated with the service provider (PRS1) to create a second signed data buffer (SDB2) at 135. A service provider's first public key (PBS1) may be associated with SDB2 to create a second data record (DR2) at 140.

The first and second data records (DR1 and DR2) may be combined to create a combined data record (CDR) at 145. CDR may be signed with a second private key of the service provider (PRS2) at 150 to create a signed combined data record (SCDR). A second public key of the service provider (PBS2) may be associated with SCDR to create the secure payment authorization token.

In some embodiments, promotional and expiration information described above, or portions thereof, may be included in the combined data record (CDR). That is, some information may be included in the data buffer and the remaining information may be included in the CDR.

The secure payment authorization token thus created may then be communicated to the computer system of a customer subscribing to or utilizing services provided by the service provider. In some embodiments, the payment token may be made available to the customer computer system upon invoking the service provider's services.

Figure 2:
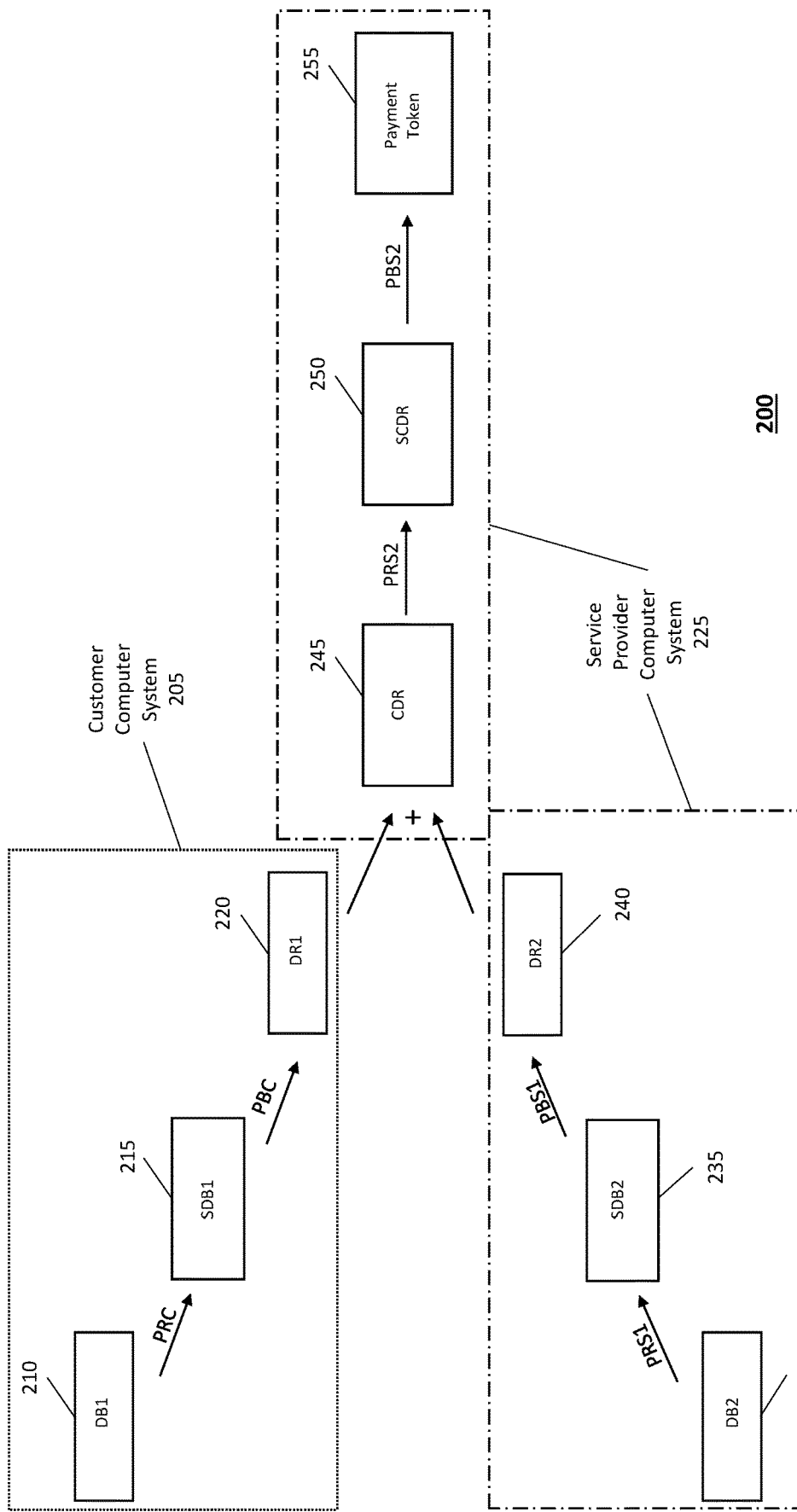

The method of creating a payment authorization token may also be described as a flow diagram in FIG. 2. DB1 210 created by a customer computer system 205 may be signed by a PRC to create SDB1 at 215. A PBC may be associated to SDB1 to create DR1 220 that may be provided to a service provider (computer system) 225.

Simultaneously, subsequently or previously, DB2 230 created by a service provider computer system 225 may be signed by PRS1 to create SDB2 235. SDB2 may be associated with PBS1 to create DR2 240.

DR1 120 and DR2 240 may be combined by the service provider (computer system) 225 to create CDR 245. CDR may be signed by PRS2 to create SCDR 250. SCDR 250 may be associated with PBS2 to create a payment token 255.

Figure 3:
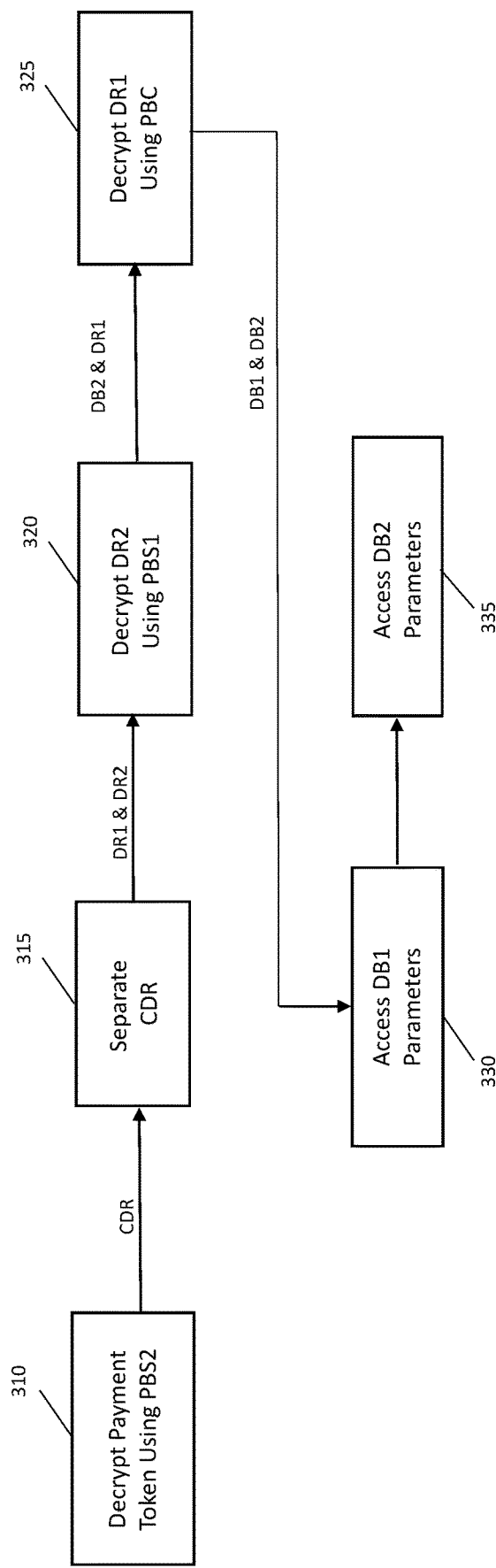
FIG. 3 illustrates an example method for decrypting the secure payment token of FIG. 1.

The payment token created in accordance with method 100 of FIG. 1 may be decrypted (by a service provider computer system) as illustrated in FIG. 3.

PBS2 may be used to decrypt the token to extract CDR at 310. CDR may be separated into DR1 and DR2 at 315. As described above (with reference to FIG. 2), the combined data record is made up of encrypted DR1 and DR2. DR2 may be decrypted using PBS1 at 320. DR1 may be decrypted using PBC at 325. Parameters in each of DB1 and DB2 may be accessed at 330 and 335 respectively.

In some situations, the customer may wish to share payments for services utilized among different accounts. This may occur if multiple divisions, units or locations of the customer utilize the services provided by a service provider. The customer may desire to keep more accurate accounting records to apportion the expenses among the various sub-entities of the customer.

Figure 4:
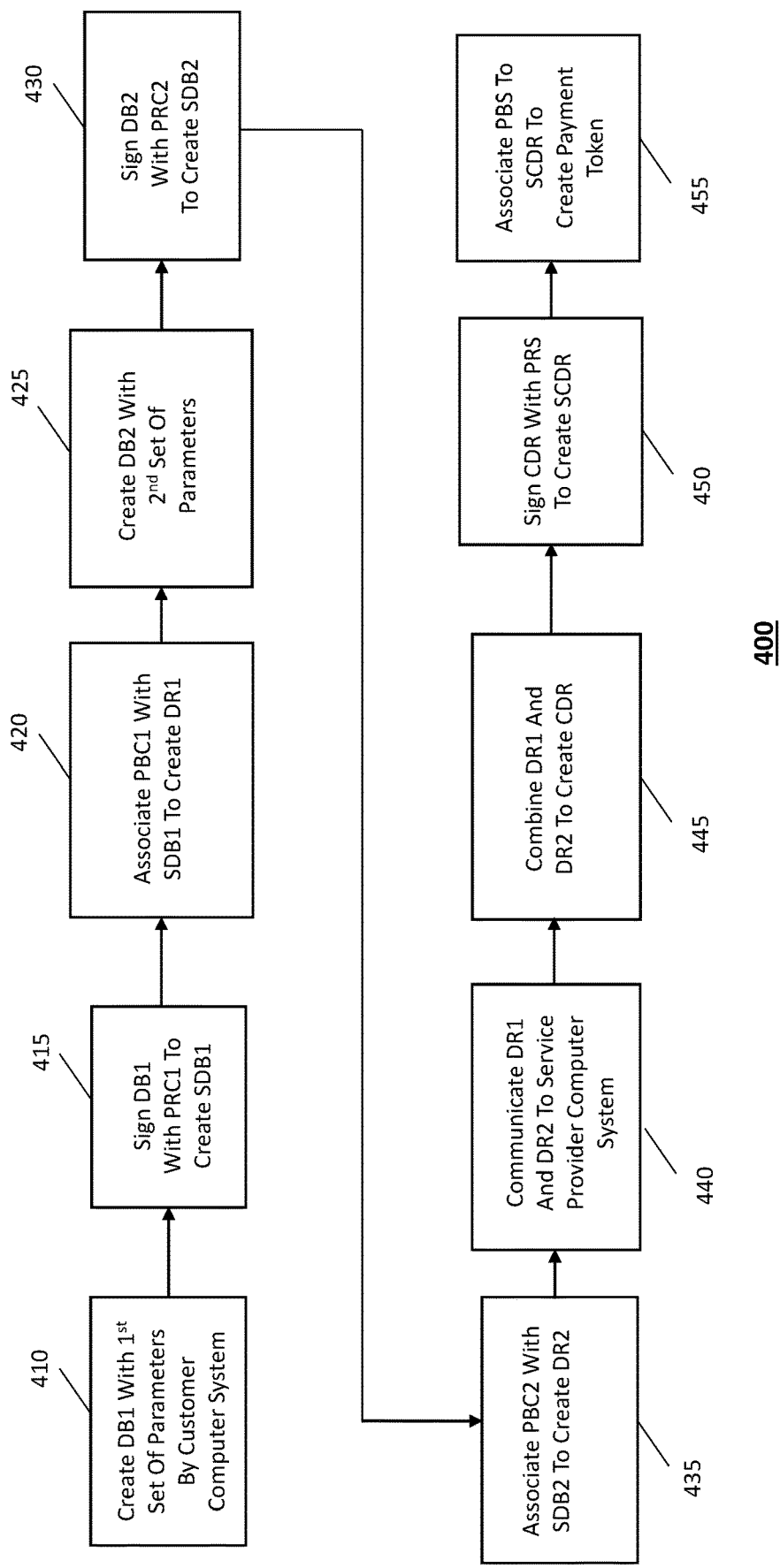
FIGS. 4 and 5 illustrate a further example embodiment for creating a secure payment token.

Embodiments of the present disclosure facilitate such apportionment. A method in accordance with such embodiments is illustrated in FIG. 4.

A customer computer system (i.e. computing system of a customer subscribing to the services of a service provider such as one subscribing to a service provider) may create a first data buffer (DB1) at 410. DB1 may include a first set of parameters. The first set of parameters may include a customer identification (such as an account number) and a primary payment source information for customer. The payment source information can be a bank account number or a credit or debit card number.

DB1 may then be signed with a first private key of the customer (PRC1) to create a first signed data buffer (SDB1) at 415. A first public key of the customer (PBC1) may be associated with SDB1 to create a first data record (DR1) at 420.

The customer may then create a second data buffer (DB2) at 425. DB2 may include a second set of parameters. The second set of parameters may include a customer identification and a secondary or supplemental payment source information for the customer. The payment source information can be a bank account number or a credit or debit card number.

DB2 may be signed with a second private key of the customer (PRC2) to create a second signed data buffer (SDB2) at 430. A second public Key of the customer (PBC2) may be associated with SDB2 to create a second data record (DR2) at 435.

DR1 and DR2 may be communicated to a service provider computer system at 440. In the illustrated embodiment of FIG. 4, DR1 and DR2 are created sequentially and communicated to the service provider. In some example embodiments (not illustrated), DR1 and DR2 can be created and each one may be communicated to the service provider separately upon its creation.

The service provider may combine DR1 and DR2 to create a combined data record (CDR) at 445. The combined data record may be signed with a private key of the service provider (PRS) to create a signed combined data record (SCDR) at 450. A public key of the service provider (PBS) may be associated with SCDR to create the secure payment authorization token at 455.

The secure payment authorization token thus created may then be communicated to a customer (computer system) subscribing to or utilizing services provided by the service provider.

In the method of FIG. 4, the customer (computer system) can further define the proportionate use of the multiple (i.e. two) accounts. For example, the customer (computer system) may specify that the cost of using the services may be split evenly between the multiple accounts. The customer may also specify the percentages that may be charged to the accounts. The customer (computer system) may also specify a first amount up to which may be charged to a first account. In this scenario, the balance (beyond the first amount) may be charged to a second account.

Such customer specified information can be included within the second set of parameters (i.e. second data buffer). In some embodiments, such information or portions thereof can be included within the combined data record (CDR). That is, some information may be included in the second data buffer and the remaining information may be included in the CDR.

In some example embodiments, since DB1 and DB2 are being encrypted by the customer (to create DR1 and DR2), they can be signed with the same private/public key pair.

Figure 5:
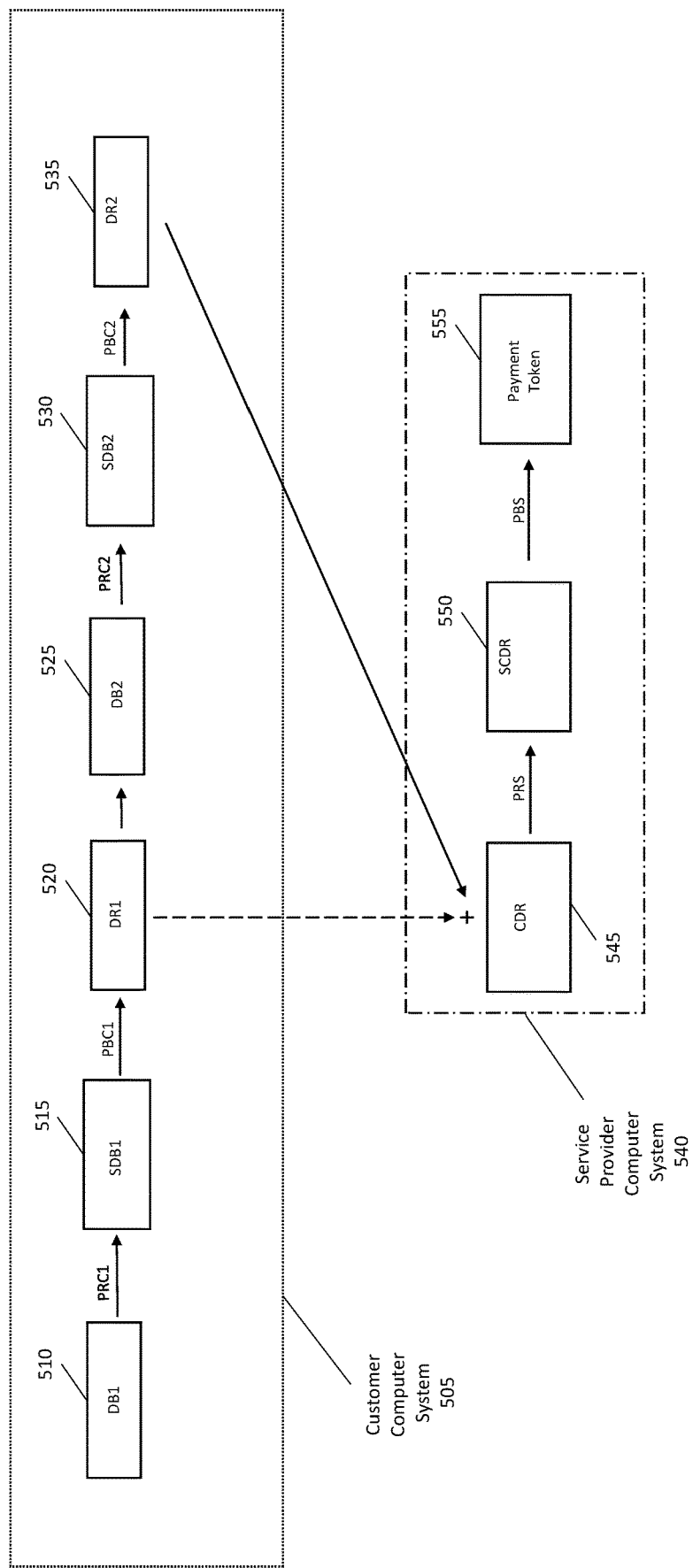

Method of 400 of FIG. 4 may be described as a flow diagram in FIG. 5. DB1 510 created by a customer computer system 505 may be signed by PRC1 to create SDB1 515. PBC1 may be associated with SDB1 to create DR1 520 that may be provided to a service provider computer system 540.

DB2 525 created by the customer may be signed with PRC2 to create SDB2 530. PBC2 may be associated with SDB2 to create DR2 535 that may be provided to the service provider computer system.

As described above with respect to FIG. 4, DB1 and DB2 can be created sequentially and communicated to the service provider (computer system) or created separately and communicated separately (upon creation). The dashed arrow from 520 to 545 illustrates the separate creation/communication scenario. The arrow from 520 to 525 illustrates the sequential creation/communication scenario. In the sequential creation/communication scenario, DR1 can be stored until DR2 is created and then they can be communicated to the service provider computer system. The choice of sequential or separate communication may depend on available bandwidth, memory, etc.

DR1 520 and DR2 535 may be combined by the service provider to create CDR 545. CDR 545 may be signed by PRS to create a SCDR 550. PBS may be associated with SCDR 550 to create a payment token 555.

Figure 6:
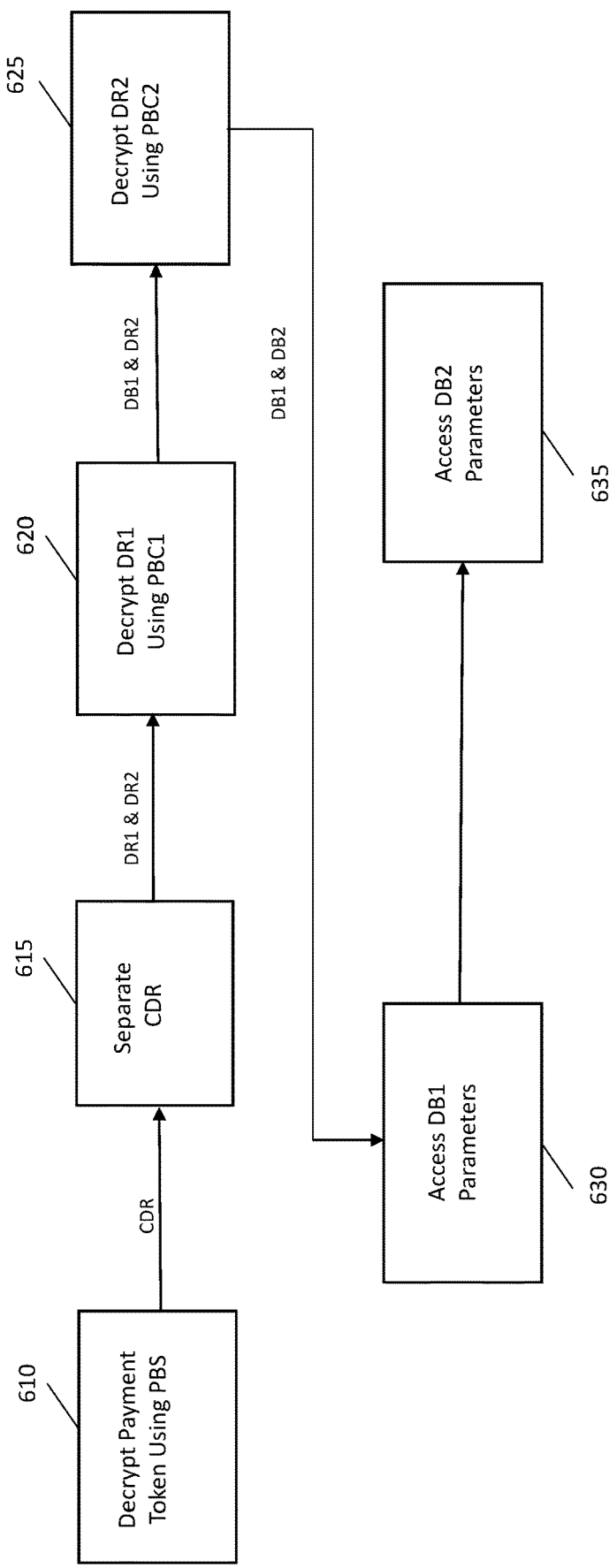
FIG. 6 illustrates an example method for decrypting the secure payment token of FIG. 5.

The payment token created in accordance with method 400 of FIG. 4 may be decrypted as illustrated in FIG. 6.

PBS may be used to decrypt the token to extract CDR at 610. CDR may be separated into DR1 and DDR2 at 615. DR1 may be decrypted using PBC1 at 620. DR2 may be decrypted using PBC2 at 625. Parameters in each of DB1 and DB2 may be accessed at 630 and 635 respectively.

A customer may present the payment authorization token to a service provider for services utilized by the customer. The service provider may validate the token.

The token may be validated by determining whether the keys used to generate it (i.e. the token) are current. The public keys may be used to decrypt the token as described above to access the data parameters. The parameters include account identifying information.

In example embodiments, the service provider may maintain an account management service in which the public keys used are published. The public keys used for decryption may be checked against the published keys to determine a match. If the keys match, then the token can be utilized.

The payment authorization token can be revoked by either party (i.e. customer or service provider) at will. A replacement key can be published to the account management service to invalidate an old key for example. Any number of reasons can provide the basis for such a revocation. A key can be revoked/replaced for fear of it being compromised. It can be revoked if a service agreement between a customer and a service provider is terminated.

Upon the key being updated, any attempt to use an older payment authorization token will fail as the public keys used for the token will no longer match those published with the account management service.

If a customer chooses to invalidate their key, the consumer can generate a new public/private key pair and re-sign the data buffer of the payment authorization token with the new private key to form a working token for subsequent use without requiring additional action by a service provider other than to accept the newly published public key.

The generation of a new public/private key pair and re-signing of the data buffer of the payment authorization token may not preclude use of the old token if a customer still has a copy of the old key. In order to completely invalidate a key, the customer has to publish a replacement public key to the service provider's account management service for the customer account. Then, the old token cannot be used anymore because the customer public key in the token no longer matches the customer public key in the service.

For a limited time offer, a promotional data buffer may be signed with a private key created specifically for the promotion. When the promotion ends, the corresponding public key for the promotion can be deactivated (overwritten) in the account management service and tokens using the promotion will cease to work immediately.

Figure 7:
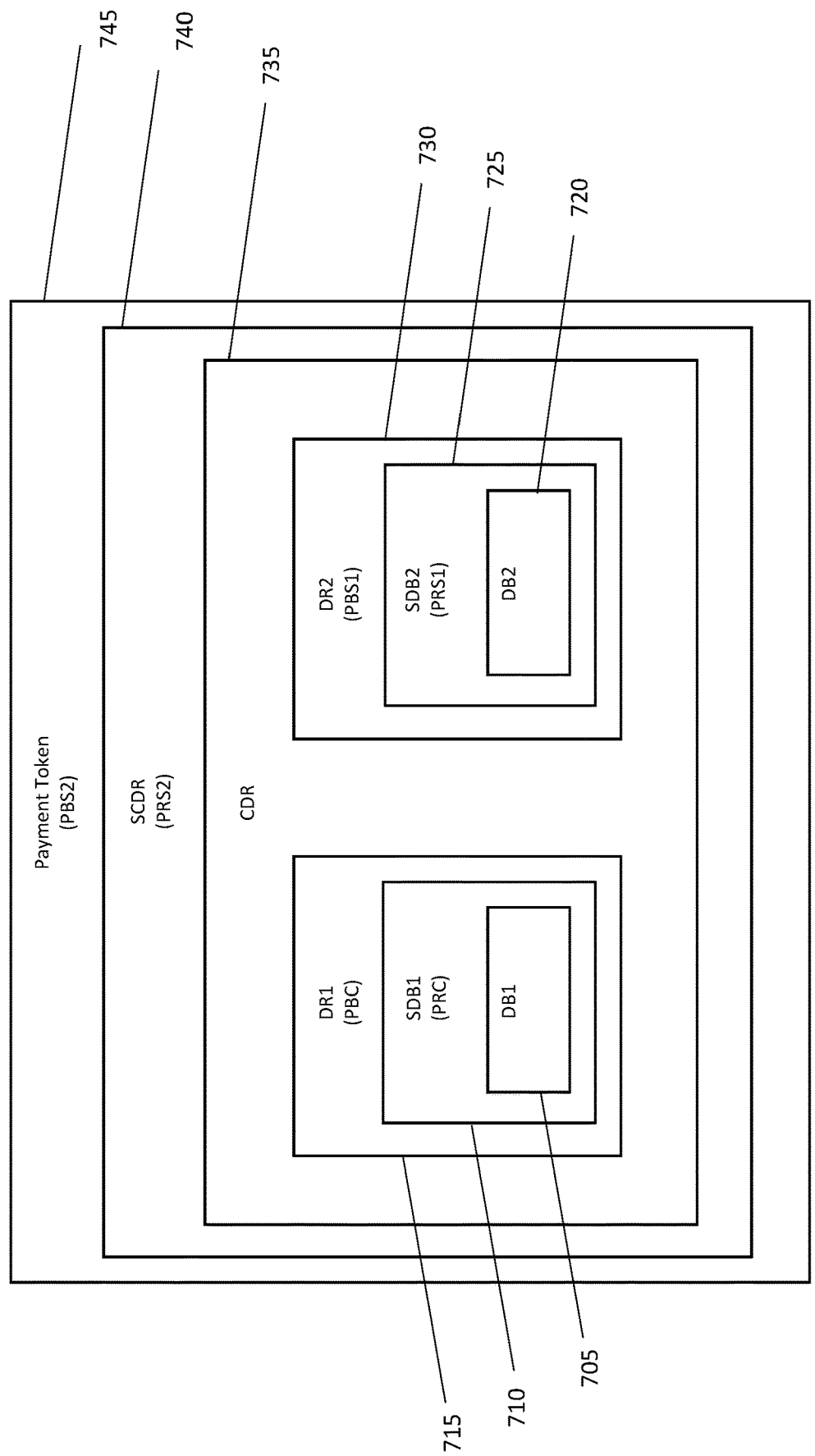
FIGS. 7 and 8 illustrate example payment tokens created in accordance to the methods of FIGS. 1 and 2)

A payment token created in accordance with the method of FIG. 1 (and FIG. 2) is illustrated in FIG. 7. DB1 705 created by a customer may be signed by PRC to create a SDB1 710. PBC may be associated with SDB1 to create DR1 715.

DB2 720 created by a service provider may be signed by PRS1 to create SDB2 725. PBS1 may be associated with SDB2 to create DR2 730.

DR2 730 may be created by the service provider in response to receiving DR1 715 from a customer. In some embodiments, DR2 may be created by the service provider prior to or, independent of, receiving DR1. In example embodiments, this would be done through a separate token generation service provided by the service provider.

DR1 and DR2 (715 and 730) may be combined by the service provider to create a CDR 735. CDR 735 may be signed by PRS2 to create SCDR 740. PBS2 SP may be associated with SCDR to create the payment token 745.

Figure 8:
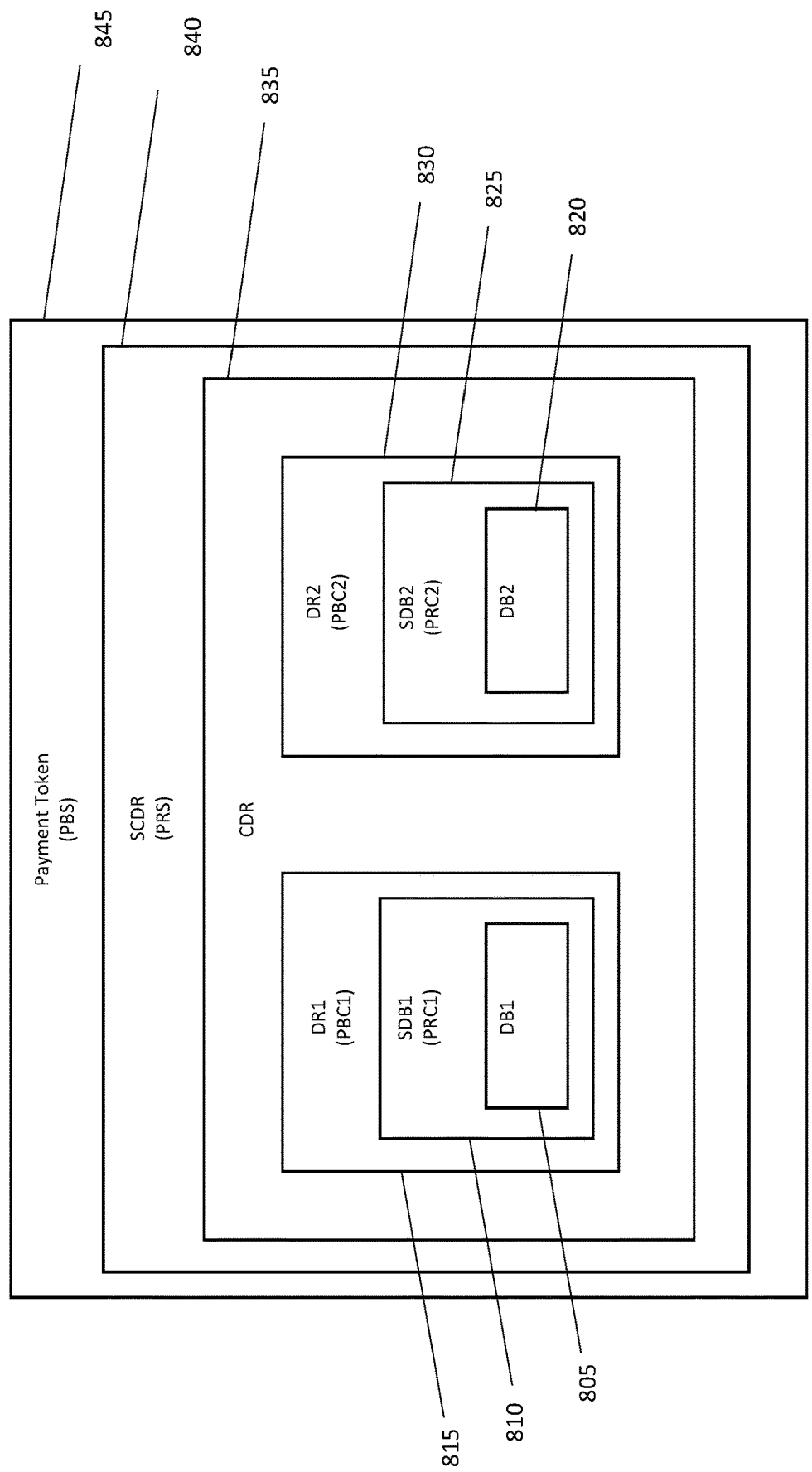

A payment token created in accordance with the method of FIG. 4 (and FIG. 5) is illustrated in FIG. 8. DB1 805 created by a customer may be signed by PRC1 to create SDB1 810. PBC1 may be associated with SDB1 to create DR1 815.

DB2 820 created by the customer may be signed by PRC2 to create SDB2 825. PBC2 may be associated with SDB2 825 to create DR2 830.

DR1 and DR2 (815 and 830) may be created by the customer either in dependence or independent of each other. The data records may be submitted to a service provider which combines the data records to create CDR 835. CDR 835 may be signed by PRS to create SCDR 840. PBS may be associated with SCDR to create payment token 845.

Figure 9:
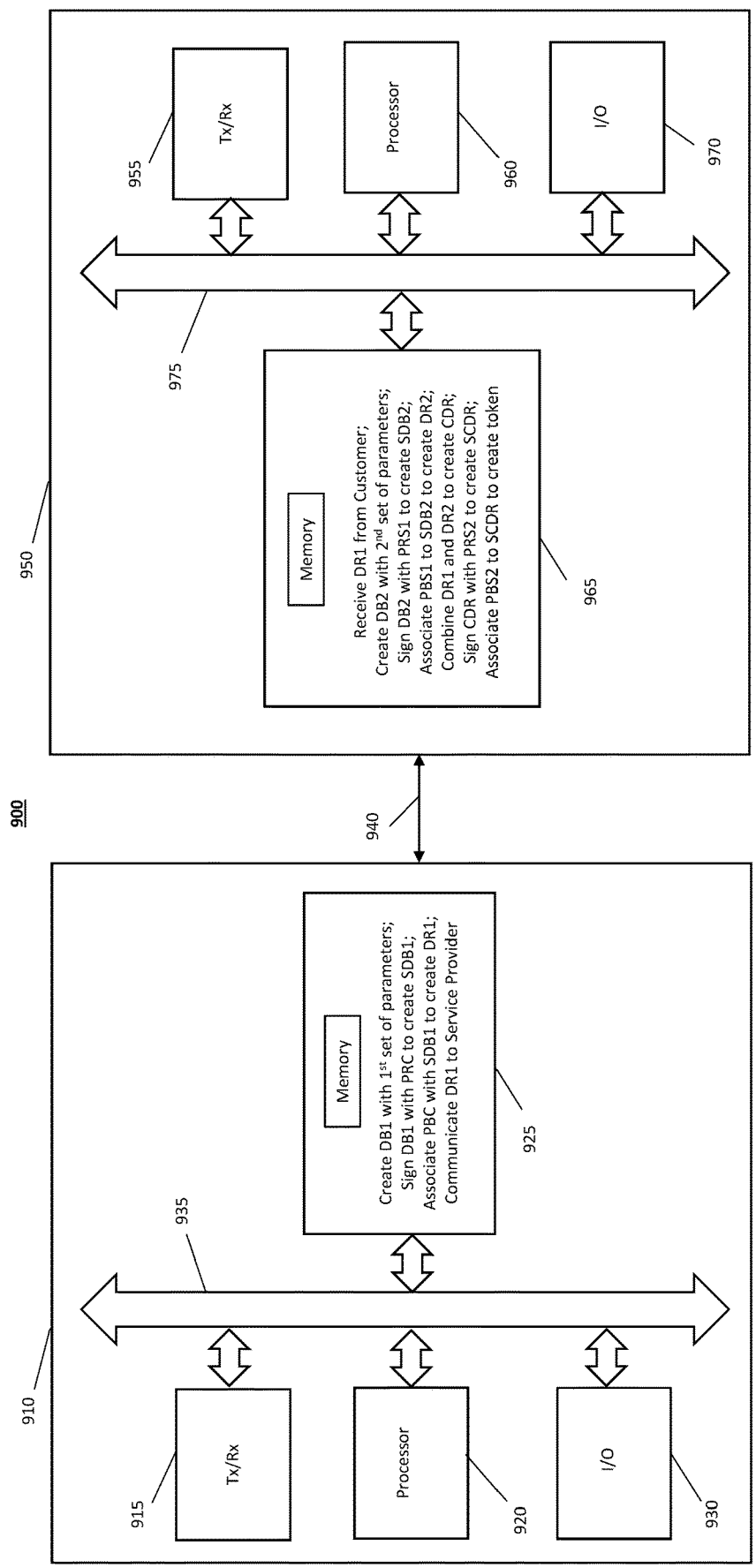
FIG. 9 illustrates an example system with customer and service provider computing devices.

FIG. 9 is a block diagram illustrating an example system. System 900 may include a customer computer system 910 and a servicer provider computer system 950. Customer computer system 910 may include a transceiver 915, a processor 920, a non-transitory computer readable storage medium 925 and an input/output 930. Communication among each of these components may be facilitated by data bus 935.

Service provider computer system 950 may include a transceiver 955, a processor 960, a non-transitory computer readable storage medium 965 and an input/output 970. Communication among each of these components may be facilitated by data bus 975.

The non-transitory computer readable storage media 925 and 965 may store instructions executable by the respective processors 920 and 960. In the example illustrated in FIG. 9, the instructions can result in the processors implementing the steps of the methods described herein with respect to FIGS. 1, 2 and 7.

Memory 925 can include instructions for creating DB1, signing DB1 with PRC to create SDB1, associating PBC to SDB1 to create DR1 and for communicating DR1 to service provider computer system 950. PRC and PBC may also be stored in memory 925. DR1 may be transmitted via transceiver 915.

The transmitted DR1 may be received by service provider computer system 950 via transceiver 955. Memory 965 can include instructions for creating DB2, signing DB2 with PRS1 to create SDB2, associating PBS1 to SDB2 to create DR2, combining DR1 and DR2 to create CDR, signing CDR with PRS2 to create SCDR and associating PBS2 to SCDR to create the payment token.

PRS1, PBS1, PRS2 and PBS2 may be also be stored on memory 965. The token can be communicated to the customer computer system.

The respective computing devices associated with a customer and a service provider may communicate with each other over a network 940. The network can be a public network or a private network.

In other embodiments, the memory 925 and 965 may include instructions that can be executed by the respective processors 920 and 960 to implement the steps of the methods described herein with respect to FIGS. 4, 5 and 8.

Encryption and decryption as specified above may utilize known techniques and therefore, are not described further. In some embodiments, the encryption may be asymmetric encryption. The keys issued may also have an expiration date or period of validity from date of first use.

A customer can generate multiple key pairs as needed or desired. A service provider can have multiple pairs of keys for a customer if the customer has multiple accounts with the service provider such as one for a particular project, a location or a division.

The pairs of keys (private/public) can be generated and assigned to (or associated with) a particular customer account by the service provider. Similarly, the customer can generate keys and assign (or associate) them to a particular service provider.

Example methods as described above for creating tokens can be performed by an automated, guided process. The user may be prompted to enter the first set of parameters by a computing device of the service provider while connected to the user computer. The interaction between the service provider and customer in creating the tokens can also be facilitated on a web browser interface.

While the present disclosure has been described in connection with certain example embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method comprising:

storing, in a memory of a service provider computer of a service provider, a first public key of the service provider, a second public key of the service provider, a first private key of the service provider, and a second private key of the service provider;

receiving, by the service provider computer, a first data record from a customer computer of a customer, wherein the first data record comprises a first data buffer signed by a private key of the customer and having a public key of the customer associated with the signed first data buffer, wherein the first data buffer includes a first set of parameters specified by the customer;

creating, by the service provider computer, a second data buffer including a second set of parameters specified by the service provider;

signing, by the service provider computer, the second data buffer with the first private key of the service provider;

associating the first public key of the service provider with the signed second data buffer to create a second data record;

combining, by the service provider computer, the first data record and the second data record to create a combined data record;

signing, by the service provider computer, the combined data record with the second private key of the service provider;

associating the second public key of the service provider with the signed combined data record to create a payment token;

further storing, in the memory, the public key of the customer, the first data record comprising the first data buffer, the second data buffer, the second data record, the combined data record, and the payment token;

sending, from the service provider computer to the customer computer, the payment token;

providing, by the service provider to the customer computer, a software service or a hardware service;

receiving, at the service provider computer from the customer computer, the payment token in association with a utilization of the software service or the hardware service by the customer computer;

decrypting, by the service provider computer, the received payment token at the service provider computer using the second public key of the service provider, the decrypting of the received payment token extracting the combined data record;

separating, by the service provider computer, the extracted combined data record into the first data record and the second data record;

decrypting, by the service provider computer, the first data buffer in the first data record of the extracted combined data record using the public key of the customer;

decrypting, by the service provider computer, the second data buffer in the second data record of the extracted combined data record using the first public key of the service provider;

extracting, by the service provider computer, the first set of parameters from the decrypted first data buffer and the second set of parameters from the decrypted second data buffer to obtain payment information for the utilization of the software service or the hardware service by the customer computer;

receiving, at the service provider computer from the customer computer, a revocation of the public key of the customer, wherein the revocation of the public key of the customer comprises a publication of a replacement public key of the customer to a management service of the service provider; and revoking, by the service provider computer, the payment token responsive to the revocation of the public key of the customer.

2. The method of claim 1, wherein the first set of parameters comprises a customer identification and customer financial account information.

3. The method of claim 2, wherein the customer financial account information includes a bank account identification, a credit card account identification, or a debit card account identification.

4. The method of claim 1, wherein the second set of parameters comprises a customer identification and promotion information.

5. The method of claim 4, wherein the promotion information comprises a percentage discount or a discount amount.

6. The method of claim 5, wherein the promotion information comprises an expiration date or a period of validity from date of first use.

7. The method of claim 1, wherein the first data record is received from the customer computer over a network.

8. The method of claim 1, further comprising:
receiving, at the service provider computer, the replacement public key of the customer.

9. The method of claim 1, wherein the payment token is sent to the customer computer of the customer that has subscribed to services of the service provider.

10. The method of claim 1, wherein the payment token is received from the customer computer at the service provider computer for payment of the utilization of the software service or the hardware service by the customer computer.

11. The method of claim 1, wherein the first public key and the first private key are part of a first public-private key pair of the service provider, and the second public key and the second private key are part of a second public-private key pair of the service provider.

12. A non-transitory machine-readable storage medium comprising instructions that upon execution cause a service provider computer of a service provider to:
store, in a memory of the service provider computer, a public key and a private key of the service provider;
receive, at the service provider computer, a first data record and a second data record from a customer computer of a customer, wherein the first data record comprises a first data buffer signed by a first private key of the customer and having a first public key of the customer associated with the signed first data buffer, the first data buffer including a first set of parameters specified by the customer, and wherein the second data record comprises a second data buffer signed by a second private key of the customer and having a second public key of the customer associated with the signed second data buffer, the second data buffer including a second set of parameters specified by the customer;
combine, at the service provider computer, the first data record and the second data record to create a combined data record;
sign, using the service provider computer, the combined data record with the private key of the service provider;
associate, using the service provider computer, the public key of the service provider with the signed combined data record to create a payment token;
further store, in the memory, the first and second public keys of the customer, the first data record comprising the first data buffer, the second data record comprising the second data buffer, the combined data record, and the payment token;
send, from the service provider computer to the customer computer, the payment token;
provide, by the service provider to the customer computer, a software service or a hardware service;
receive, at the service provider computer from the customer computer, the payment token in association with a utilization of the software service or the hardware service by the customer computer;
decrypt the received payment token at the service provider computer using the public key of the service provider, the decrypting of the received payment token extracting the combined data record;
separate the extracted combined data record into the first data record and the second data record;
decrypt the first data buffer in the first data record of the extracted combined data record using the first public key of the customer;
decrypt the second data buffer in the second data record of the extracted combined data record using the second public key of the customer;
extract the first set of parameters from the decrypted first data buffer and extract the second set of parameters from the decrypted second buffer to obtain payment information for the utilization of the software service or the hardware service by the customer computer;
receive, from the customer computer, a revocation of the first public key or the second public key of the customer, wherein the revocation of the first public key or the second public key of the customer comprises a publication of a replacement public key of the customer to a management service of the service provider; and
revoke the payment token responsive to the revocation of the first public key or the second public key of the customer.

13. The non-transitory machine-readable storage medium of claim 12, wherein the first set of parameters comprises a customer identification and primary payment source information of the customer.

14. The non-transitory machine-readable storage medium of claim 13, wherein the second set of parameters comprises secondary payment source information of the customer.

15. The non-transitory machine-readable storage medium of claim 14, wherein the second set of parameters further comprises an allocation of payment between a primary payment source identified by the primary payment source information, and a secondary payment source identified by the secondary payment source information.

16. The non-transitory machine-readable storage medium of claim 15, wherein the allocation of payment comprises a first percentage assigned to the primary payment source and a remaining percentage assigned to the secondary payment source.

17. The non-transitory machine-readable storage medium of claim 15, wherein the allocation of payment comprises a fixed amount assigned to the primary payment source.

18. The non-transitory machine-readable storage medium of claim 12, wherein the instructions upon execution cause the service provider computer to:
receive, at the service provider computer, the replacement public key.

19. The non-transitory machine-readable storage medium of claim 12, wherein the payment token is sent to the customer computer of the customer that has subscribed to services of the service provider.

20. A service provider computer comprising:
a memory storing a first public key of a service provider, a second public key of the service provider, a first private key of the service provider, and a second private key of the service provider;
a processor; and
a non-transitory storage medium storing instructions executable on the processor to:
receive, at the service provider computer of a service provider, a first data record from a customer computer of a customer, wherein the first data record comprises a first data buffer signed by a private key of the customer and having a public key of the customer associated with the signed first data buffer, wherein the first data buffer includes a first set of parameters specified by the customer;

create, at the service provider computer, a second data buffer including a second set of parameters specified by the service provider;

sign, at the service provider computer, the second data buffer with the first private key of the service provider;

associate the first public key of the service provider with the signed second data buffer to create a second data record;

combine, at the service provider computer, the first data record and the second data record to create a combined data record;

sign, at the service provider computer, the combined data record with the second private key of the service provider;

associate the second public key of the service provider with the combined data record to create a payment token, the memory further storing the public key of the customer, the first data record comprising the first data buffer, the second data buffer, the second data record, the combined data record, and the payment token, wherein the instructions are executable on the processor further to:

send, from the service provider computer to the customer computer, the payment token;

provide, by the service provider computer to the customer computer, a software service or a hardware service;

receive, at the service provider computer from the customer computer, the payment token in association with a utilization of the software service or the hardware service by the customer computer;

decrypt the received payment token at the service provider computer using the second public key of the service provider, the decrypting of the received payment token extracting the combined data record;

separate the extracted combined data record into the first data record and the second data record;

decrypt the first data buffer in the first data record of the extracted combined data record using the public key of the customer;

decrypt the second data buffer in the second data record of the extracted combined data record using the first public key of the service provider;

extract the first set of parameters from the decrypted first data buffer and the second set of parameters from the decrypted second data buffer to obtain payment information for the utilization of the software service or the hardware service by the customer computer;

receive, from the customer computer, a revocation of the public key of the customer, wherein the revocation of the public key of the customer comprises a publication of a replacement public key of the customer to a management service of the service provider; and revoke the payment token responsive to the revocation of the public key of the customer.

* * * * *